UNITED STATES PATENT OFFICE.

JOHN W. HORNSEY, OF SUMMIT, NEW JERSEY, ASSIGNOR TO GENERAL REDUCTION GAS AND BY-PRODUCTS COMPANY, A CORPORATION OF DELAWARE.

PROCESS FOR SEPARATING BORAX AND POTASSIUM CHLORID.

1,288,591.

Specification of Letters Patent. Patented Dec. 24, 1918.

No Drawing. Application filed April 17, 1915. Serial No. 22,105.

*To all whom it may concern:*

Be it known that I, JOHN W. HORNSEY, a citizen of the United States, and a resident of Summit, Union county, New Jersey, have invented certain new and useful Improvements in Processes for Separating Borax and Potassium Chlorid in Mixtures of the Same, of which the following is a specification.

My invention relates to the separation of borax and potassium salts from mixtures of salts containing these compounds.

When the mixtures are not in solution I first dissolve them, and I have found that it is possible to separate from a brine containing a variety of salts, such, for instance, as exist in certain "alkali" lakes and other waters, a mixture of potassium chlorid (KCl) and borax (sodium tetra borate, $Na_2B_4O_7-10H_2O$). These salts, in dissolving and recrystallizing, normally precipitate or crystallize out together. The object of my invention is to separate these salts so that they may be recovered in a state of marketable purity.

It is well known that if these two salts are present in certain proportions in a solution, either with or without minor percentages of other salts, a cooling of this solution will cause the precipitation of a "salt cake" containing both borax and potassium chlorid, but that if either one of these two salts be present in very much greater quantity than the other, the precipitate will consist substantially of the salt which largely predominates.

I have found, however, that if the relative percentages of these salts is such that they would tend normally to crystallize out together from a saturated or nearly saturated solution, a very different result may be obtained from a more or less dilute solution. With this object in view, I take a solution containing a mixture of potassium chlorid and borax which is saturated, or nearly so, at a temperature of approximately 200° F. I first dilute the solution with water at approximately the same temperature until a fairly dilute solution results; or in first making up the solution, enough water may be used to give approximately the desired specific gravity. I find that a solution of the specific gravity of 1.12 to 1.22 at a temperature of 200° F. answers very well for this purpose. I then cool this diluted brine to a temperature of preferably about 40° F., at which temperature part of the borax is precipitated, and when separated from the solution is of a sufficient degree of purity to be marketable after the usual washing or cleansing operation.

I then evaporate a sufficient amount of water from the filtrate remaining after the separation of the borax, which filtrate is saturated at its temperature to bring it substantially to the point of saturation at a higher temperature, that is, to the point at which crystals begin to form at the temperature which may be used for evaporation. I then cool the saturated solution from its elevated temperature to preferably about 40° F., at which temperature potassium chlorid is precipitated from the solution, which, after the usual washing or cleansing operation, is of a marketable degree of purity.

I do not, however, wish to be understood as limiting myself to the particular temperatures or specific gravity specified above, as these may be varied in comparatively wide ranges.

The remaining filtrate is still saturated at the temperature at which the potassium chlorid has been precipitated, and contains both potassium chlorid and borax. I therefore pass the filtrate through the same cycle, heating, diluting and cooling, then concentrating and cooling to the same temperature and density specified above, thus obtaining alternate crops of borax and potassium chlorid, repeating this operation until the separation is substantially completed, or I may mix the filtrate with new material and repeat the same cycles of operation indefinitely, with the resulting alternate crops of borax and potassium chlorid. If appreciable percentages of other salts, however, are present in the solution it is preferable to mix the filtrate, after the potassium chlorid has been separated, with new material, until the percentage of other salts becomes so high as to render it advisable to remove at least a portion of such salts by evaporation or otherwise.

In this manner I am enabled to resolve mixtures of potassium chlorid and borax into their component salts.

The terms and expressions which I have employed are used as terms of description and not of limitation, and I have no intention, in the use of such terms and expressions, of excluding any step which may be any equivalent of any of the features which I have described, but recognize that various modifications are possible within the scope of the invention claimed.

Having described my process for effecting such separation, what I desire to claim is:

1. The method of separating borax and potassium chlorid, which consists in cooling a heated solution containing said salts having a specific gravity of from 1.12 to 1.22 at about 200 F., thereby precipitating borax and separating the borax from the solution.

2. A method of separating potassium chlorid and borax from a mixture of salts in solution, which consists in bringing the solution to a specific gravity of from 1.12 to 1.22 at about 200° F., and cooling to precipitate borax, separating the borax from the solution, and then concentrating the liquid residue and cooling same to precipitate potassium chlorid.

3. The method of separating borax and potassium chlorid from a mixture of salts in solution which consists in diluting the solution to a specific gravity of from 1.12 to 1.22 at about 200° F., cooling and precipitating the borax, separating the precipitate from the solution, heating the liquid residue, concentrating and cooling same to precipitate potassium chlorid, and repeating the cycle of operations with the residue of the said mixture.

4. The method of separating borax from potassium chlorid, which consists in cooling a dilute solution of borax and potassium chlorid having a specific gravity of from 1.12 to 1.22 at about 200° F., thus precipitating the borax, separating it therefrom, concentrating and cooling the filtrate, thus precipitating potassium chlorid and separating therefrom, adding a further mixture of borax and potassium chlorid, and repeating the cycle.

5. The method of separating borax and potassium chlorid which consists in cooling a heated solution of said salts having a specific gravity of about 1.16 at about 200° F., and separating the precipitate.

6. The method of separating borax and potassium chlorid which consists in cooling a heated solution of said salts having a specific gravity of about 1.16 at about 200° F., separating a precipitate, then concentrating by evaporation and cooling the solution, and separating a further precipitate.

7. The process of obtaining potassium chlorid from a solution containing borax and potassium chlorid which consists in taking a heated dilute solution having a specific gravity of from 1.12 to 1.22 at about 200° F., separating borax as a precipitate by cooling, then concentrating and cooling the solution, and separating potassium chlorid as a precipitate.

8. The process of separating potassium chlorid from a solution of borax and potassium chlorid, which consists in diluting the solution to a specific gravity of from 1.12 to 1.22 at about 200° F., cooling to about 40° F. to precipitate the borax, separating the borax from the solution, concentrating the resulting solution at about 200° F., cooling to about 40° F. to precipitate the potassium chlorid.

JOHN W. HORNSEY.